(12) United States Patent
Li

(10) Patent No.: US 12,471,107 B2
(45) Date of Patent: Nov. 11, 2025

(54) RESOURCE ASSIGNMENT METHOD, TERMINAL, AND NETWORK SIDE DEVICE

(71) Applicant: VIVO MOBILE COMMUNICATION CO., LTD., Dongguan (CN)

(72) Inventor: Na Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 411 days.

(21) Appl. No.: 18/074,438

(22) Filed: Dec. 2, 2022

(65) Prior Publication Data

US 2023/0114940 A1 Apr. 13, 2023

Related U.S. Application Data

(63) Continuation of application No. PCT/CN2021/097636, filed on Jun. 1, 2021.

(30) Foreign Application Priority Data

Jun. 2, 2020 (CN) .......................... 202010491261.3

(51) Int. Cl.
*H04W 72/23* (2023.01)
*H04W 72/1273* (2023.01)

(52) U.S. Cl.
CPC ....... *H04W 72/23* (2023.01); *H04W 72/1273* (2013.01)

(58) Field of Classification Search
CPC .......................... H04W 72/1273; H04W 72/23
USPC ....................................................... 370/329
See application file for complete search history.

(56) References Cited

U.S. PATENT DOCUMENTS

| | | | |
|---|---|---|---|
| 2018/0343645 | A1 | 11/2018 | Papasakellariou et al. |
| 2020/0008202 | A1* | 1/2020 | Li .......................... H04L 5/0094 |
| 2020/0022144 | A1* | 1/2020 | Papasakellariou .... H04L 5/0053 |

FOREIGN PATENT DOCUMENTS

| | | |
|---|---|---|
| CN | 110022194 A | 7/2019 |
| CN | 110351859 A | 10/2019 |
| CN | 111148230 A | 5/2020 |
| WO | 2019050143 A1 | 3/2019 |
| WO | 2020030253 A1 | 2/2020 |

OTHER PUBLICATIONS

International Search Report issued in corresponding International Application No. PCT/CN2021/097636, mailed Aug. 27, 2021, 4 pages.
Samsung, "DL signals and channels for NR-U", 3GPP TSG RAN WG1 #101 e-Meeting, R1-2003858, May 2020, 5 pages.

(Continued)

*Primary Examiner* — Peter G Solinsky
(74) *Attorney, Agent, or Firm* — IPX PLLC

(57) ABSTRACT

A resource assignment method, a terminal, and a network side device are provided. The method in this application includes: determining a quantity of Frequency Domain Resource Assignment (FDRA) bits in multicast Downlink Control Information (DCI) based on predefined information or a first quantity of Resource Blocks (RBs); and determining, based on information corresponding to FDRA of the quantity of bits, FDRA of a multicast Physical Downlink Shared Channel (PDSCH) scheduled by the multicast DCI.

19 Claims, 9 Drawing Sheets

(56) References Cited

OTHER PUBLICATIONS

Samsung, DL signals and channels for NR-U, 3GPP TSG RAN WG1 #100bis-e e-Meeting, R1-2002115, Apr. 2020, 6 pages.
3GPP TSG RAN., "NR; Multiplexing and channel coding (Release 16)", 3GPP TS 38.212 V16.1.0, Mar. 31, 2020, 146 pages.
Office Action issued in related Chinese Application No. 202010491261.3, mailed Jun. 28, 2024, 8 pages.
Extended European Search Report issued in related European Application No. 21819002.3, mailed Oct. 9, 2023, 10 pages.
Office Action issued in related Korean Application No. 10-2022-7046148, mailed Mar. 24, 2025, 11 pages.
CATT, "PDCCH enhancements for URLLC", 3GPP TSG RAN WG1 #98bis, R1-1910341, Oct. 2019, 15 pages.

* cited by examiner

RESOURCE ASSIGNMENT METHOD, TERMINAL, AND NETWORK SIDE DEVICE

CROSS-REFERENCE TO RELATED APPLICATIONS

This application is a continuation of International Application No. PCT/CN2021/097636, filed on Jun. 1, 2021, which claims priority to Chinese Patent Application No. 202010491261.3 filed in China on Jun. 2, 2020. The entire contents of each of the above-referenced applications are expressly incorporated herein by reference.

TECHNICAL FIELD

This application pertains to the field of communication technologies, and in particular, to a resource assignment method, a terminal, and a network side device.

BACKGROUND

In Long Term Evolution (LTE), downlink resource assignment is performed on each carrier, and resource assignment is related to a carrier configuration. However, in a New Radio (NR) system, a User Equipment (UE) works on a UE-specific Band Width Part (BWP), and a downlink resource assignment type is configured for each BWP. A quantity of bits that indicate Frequency Domain Resource Assignment (FDRA) is related to a resource assignment type of the BWP, Sub-Carrier Spacing (SCS) bandwidth, and a Resource Block Group size (RBG size). When different BWPs are configured for different UEs, a quantity of required FDRA bits may be different. In addition, for a same FDRA value, actual physical resources corresponding to different UEs may also be different.

SUMMARY

Embodiments of this application are to provide a resource assignment method, a terminal, and a network side device.

This application is implemented as follows:

According to a first aspect, a resource assignment method is provided, is applied to a terminal, and includes:
  determining a quantity of frequency domain resource assignment FDRA bits in multicast Downlink Control Information (DCI) based on predefined information or a first quantity of resource blocks RBs; and
  determining, based on information corresponding to FDRA of the quantity of bits, frequency domain resource assignment of a multicast physical downlink shared channel PDSCH scheduled by the multicast DCI.

According to a second aspect, a resource assignment apparatus is provided, is applied to a terminal, and includes:
  a first determining module, configured to determine a quantity of frequency domain resource assignment FDRA bits in multicast downlink control information DCI based on predefined information or a first quantity of resource blocks RBs; and
  a second determining module, configured to determine, based on information corresponding to FDRA of the quantity of bits, frequency domain resource assignment of a multicast physical downlink shared channel PDSCH scheduled by the multicast DCI.

According to a third aspect, a resource assignment method is provided, is applied to a network side device, and includes:
  determining a quantity of frequency domain resource assignment FDRA bits in multicast downlink control information DCI based on predefined information or a first quantity of resource blocks RBs; and
  indicating, based on information corresponding to FDRA of the quantity of bits, frequency domain resource assignment of a multicast physical downlink shared channel PDSCH scheduled by the multicast DCI.

According to a fourth aspect, a resource assignment apparatus is provided, is applied to a network side device, and includes:
  a third determining module, configured to determine a quantity of frequency domain resource assignment FDRA bits in multicast downlink control information DCI based on predefined information or a first quantity of resource blocks RBs; and
  an indication module, configured to indicate, based on information corresponding to FDRA of the quantity of bits, frequency domain resource assignment of a multicast physical downlink shared channel PDSCH scheduled by the multicast DCI.

According to a fifth aspect, a terminal is provided. The terminal includes a processor, a memory, and a program or an instruction that is stored in the memory and that can run on the processor, and when the program or the instruction is executed by the processor, steps in the method described in the first aspect are implemented.

According to a sixth aspect, a network side device is provided. The network side device includes a processor, a memory, and a program or an instruction that is stored in the memory and that can run on the processor, and when the program or the instruction is executed by the processor, steps in the method described in the third aspect are implemented.

According to a seventh aspect, a readable storage medium is provided. The readable storage medium stores a program or an instruction, and when the program or the instruction is executed by a processor, steps in the method described in the first aspect are implemented, or steps in the method described in the third aspect are implemented.

According to an eighth aspect, a chip is provided. The chip includes a processor and a communication interface, the communication interface is coupled to the processor, and the processor is configured to run a program or an instruction of a network side device, to implement the method described in the first aspect or the method described in the third aspect.

In the embodiments of this application, the quantity of FDRA bits in the multicast DCI is determined based on the predefined information or the first quantity of RBs, and the frequency domain resource assignment of the multicast PDSCH scheduled by the multicast DCI is determined based on the information corresponding to the FDRA of the quantity of bits, so that resource assignment of the multicast PDSCH is implemented.

DETAILED DESCRIPTION

The following describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and the character "/" generally represents an "or" relationship between associated objects.

It should be noted that the technology described in this application is not limited to an LTE/LTE-Advanced (LTE-A) system, and may also be used in various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application are often used interchangeably. The described technology may be used in the foregoing system and radio technology, and may also be used in another system and radio technology. However, an NR system is described below as an example, and the term NR is used in most of the descriptions, although these technologies can also be used in an application other than an application of the NR system, for example, a sixth communication system, e.g., $6^{th}$ Generation (6G).

Figure 1:
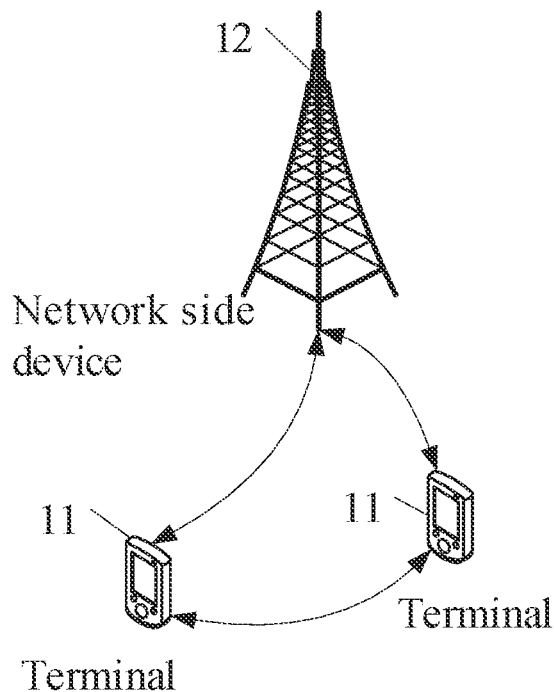
FIG. 1 is a structural diagram of a network system to which an embodiment of this application is applicable.

FIG. 1 is a block diagram of a wireless communication system applicable to an embodiment of this application. The wireless communication system includes a terminal 11 and a network side device 12. The terminal 11 may also be referred to as a terminal device or a UE. The terminal 11 may be a terminal side device such as a mobile phone, a Tablet Personal Computer, a Laptop Computer or a notebook computer, a Personal Digital Assistant (PDA), a palmtop computer, a netbook, an Ultra-Mobile Personal Computer (UMPC), a Mobile Internet Device (MID), a wearable device or a Vehicle-Mounted Device (VUE), or a Pedestrian terminal (PDE). The wearable device includes a band, a headset, eyeglasses, or the like. It should be noted that a specific type of the terminal 11 is not limited in this embodiment of this application. The network side device 12 may be a base station or a core network. The base station may be referred to as a NodeB, an evolved Node B, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a WiFi node, a Transmitting Receiving Point (TRP), or another suitable term in the field provided that a same technical effect is achieved. The base station is not limited to a specific technical term. It should be noted that, in this application, only a base station in an NR system is used as an example, but a specific type of the base station is not limited.

To enable a person skilled in the art to better understand the solutions of the embodiments of the present disclosure, the following descriptions are first provided.

In NR Rel-15, a downlink data channel supports two frequency domain resource assignment types: type (type) 0 and type 1. The type 0 supports discontinuous resource assignment. The type 1 is continuous resource assignment. If a resource allocation IE configured for Radio Resource Control (RRC) of a PDSCH is dynamic switch, UE uses type 0 or type 1 based on a type indicated by a frequency domain resource in DCI. Otherwise, the UE uses a type configured by a higher layer resource assignment IE, where a resource assignment type is configured according to each BWP. During resource assignment, a resource is assigned in a corresponding BWP, and an index of an RB is numbered in the BWP.

In a frequency domain resource assignment type 0, RBs in the BWP are assigned to multiple Resource Block Groups (RBG). Each RBG group includes P consecutive Virtual RBs (VRBs). A value of P is given by an RRC parameter RBG size and is related to bandwidth. A total quantity of RBGs in the bandwidth may be obtained by using the bandwidth and P, that is, $N_{RBG}=\lceil(N_{BWP,i}^{size}+N_{BWP,i}^{start}$ mod P)/P$\rceil$. DCI indicates, by using a bitmap of a frequency domain resource assignment information field, an RBG assigned to a UE PDSCH, a quantity of bits in the bitmap is $N_{RBG}$, $N_{RBG}$ indicates a total quantity of RBGs in the bandwidth, and $N_{BWP,i}^{size}$ indicates a size of a BWP numbered i, that is, a quantity of RBs included in a BWPi.

In a frequency domain resource assignment type 1, a value corresponding to a frequency domain assignment information field in the DCI is a Resource Indication Value (RIV), and a $\lceil\log_2(N_{BWP,i}^{size}(N_{BWP,i}^{size}+1)/2)\rceil$ bit RIV value is used to indicate a number $RB_{start}$ of a start RB assigned to a UE PDSCH and a length $L_{RBs}$ of consecutively assigned VRBs. A calculation formula of the RIV is as follows:

If $(L_{RBs}-1)\le\lfloor N_{BWP}^{size}/2\rfloor$, $RIV=N_{BWP}^{size}(L_{RBs}-1)+RB_{start}$; otherwise, $RIV=N_{BWP}^{size}(N_{BWP}^{size}-L_{RBs}+1)+(N_{BWP}^{size}-1-RB_{start})$, where $1\le L_{RBs}\le N_{BWP}^{size}-RB_{start}$, $N_{BWP}^{size}$ represents a bandwidth size of a BWP, that is, a quantity of RBs included in the BWP.

After receiving the DCI, the UE interprets the RIV in the DCI based on the bandwidth size of the BWP, that is, a quantity of RBs, to obtain values of $RB_{start}$ and $L_{RBs}$. The frequency domain resource assignment type 1 of NR does not support random assignment of resource blocks but only supports continuous frequency domain resource, thereby reducing a quantity of bits required by a transmission resource block to assign a related information field.

After determining a virtual RB assigned to the PDSCH, the UE further needs to determine a corresponding PRE resource based on a correspondence between a VRB and a Physical Resource Block (PRB). For example, when the UE is configured with downlink resource assignment of the type 1 and interleaved VRB-to-PRB mapping, the UE maps the VRB to the PRB according to a rule. If the UE is configured with downlink resource assignment of the type 0, the UE does not support interleaved NIRB-to-PRB mapping, but directly maps the VRB to the PRB.

When the UE is configured with downlink resource assignment of the type 1 and interleaved VRB-to-PRB mapping, a bit in the DCI for scheduling the PDSCH indicates whether the UE performs VRB-to-PRB mapping.

Further, in LTE broadcast/multicast transmission, a Multimedia Broadcast multicast service Single Frequency Network (MBSFN) manner is supported to send a Multimedia Broadcast Multicast Service (MBMS) service and a multicast service in a Single-Cell Point-to-Multipoint (SC-PTM) manner. In the MBSFN manner, sending is performed in an MBSFN subframe by using a Physical Multicast Channel (PMCH). Control information is sent by using system information (for example, a SIB 13) and a Multicast Control Channel (MCCH), and data is sent by using a Multicast Traffic Channel (MTCH). Both control information (a control channel parameter, a service channel parameter, scheduling information, and the like) and data information of an MBMS service are sent in a broadcast manner, so that idle-state UE and connected-state UE can receive the MBMS service, and the MBMS data information is sent only in an MBSFN subframe. SC-PTM is a multicast sending manner standardized after an MBMS service. A largest difference from the MBSFN manner is that scheduling and sending are performed only in a single cell, and service scheduling is performed by using a group Radio Network Temporary Identifier (g-RNTI). Sending is performed by using a PDSCH channel scheduled by using a Physical Downlink Control Channel (PDCCH). Control information is sent by using system information (for example, a SIB 20) and a Single Cell Multicast Control Channel (SC-MCCH), and data is sent by using a Single Cell Multicast Traffic Channel (SC-MTCH). The SC-MCCH is sent by using a PDSCH scheduled by a Single Cell RNTI (SC-RNTI) PDCCH, and the SC-MTCH is sent by using a PDSCH scheduled by a g-RNTI PDCCH. In other words, an empty channel parameter, an identifier of a service, periodic information, and the like are broadcast in a broadcast message. Scheduling information is notified by a PDCCH scrambled by the g-RNTI, and a data part is sent in a multicast manner, which is equivalent to that UE of interest listens to the g-RNTI to obtain data scheduling and then perform receiving.

UE in LTE may receive multiple broadcast/multicast services together. In the MBSFN manner, different services may have different MBSFN configurations. The UE may distinguish different services by using MBSFNs. In the SC-PTM, different services use different g-RNTIs, and the UE may distinguish different services by using the g-RNTIs.

Currently, an NR technology has undergone evolution of two versions: Rel-15 and Rel-16. In the two versions, a broadcast/multicast feature is not supported. However, there are many important use scenarios, such as public safety and mission critical, V2X applications, transparent IPv4/IPv6 multicast delivery, IPTV, software delivery over wireless, and group communication and Internet of Things (IoTs) applications. The broadcast/multicast feature can provide substantial improvement, for example, in system efficiency and user experience. Therefore, in a next Rel-17 release, a broadcast/multicast feature is to be introduced into the NR. Currently, there is no related solution to how to indicate or determine resource assignment of a multicast PDSCH.

A resource assignment method provided in embodiments of this application is described in detail below with reference to the accompanying drawings by using embodiments and application scenarios thereof.

Figure 2:
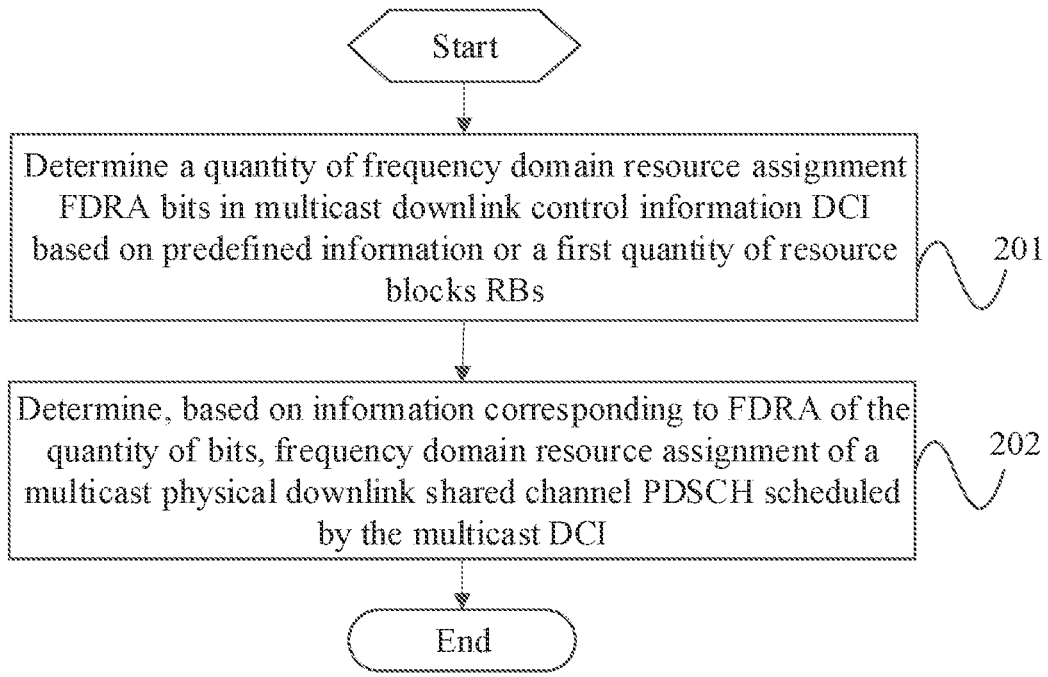
FIG. 2 is a first schematic flowchart of a resource assignment method according to an embodiment of this application.

As shown in FIG. 2, an embodiment of this application provides a resource assignment method. The resource assignment method is applied to a terminal and includes:

Step 201: Determine a quantity of frequency domain resource assignment FDRA bits in multicast downlink control information DCI based on predefined information or a first quantity of resource blocks RBs.

In this embodiment of this application, for resource assignment of a type 0, a quantity of bits in FDRA is related to a quantity of RBGs included in a BWP, and the quantity of RBGs is related to a quantity of RBs and an RBG size. DL resource assignment of a type 1 is related to a quantity of RBs included in the BWP. In other words, in the two types of resource assignment, the quantity of bits in FDRA is related to the quantity of RBs. Herein, the quantity of bits in FDRA in the multicast DCI may be determined by using the foregoing first quantity of RBs. The foregoing predefined information may be a predefined quantity of bits.

In this embodiment of this application, the quantity of bits in FDRA in the multicast DCI is determined, so that information corresponding to the quantity of bits in FDRA can be obtained, and further, frequency domain resource assignment of a PDSCH scheduled by the multicast DCI can be determined.

Step 202: Determine, based on information corresponding to FDRA of the quantity of bits, frequency domain resource assignment of a multicast physical downlink shared channel PDSCH scheduled by the multicast DCI.

Resource assignment indicated by the FDRA is relative. For example, in a resource assignment type 0, the FDRA indicates a start RB index and a quantity of consecutively assigned RBs, and in a resource assignment type 1, each bit in a bitmap corresponds to one RBG. Therefore, a reference point assigned in the FDRA needs to be determined, that is, a position at which RBs start to be numbered and RBs corresponding to RBGs. In this embodiment of this application, RBs indicated by the FDRA are determined by using a first RB, a second RB, a third RB, or a fourth RB.

The foregoing frequency domain resource may be a PRB or a VRB. In some embodiments, for the resource assignment type 0, an RBG assigned to the multicast PDSCH is determined by using a bitmap of the FDRA of the quantity of bits, to determine a corresponding VRB and a corresponding PRB. For the resource assignment type 1, a value RIV corresponding to the FDRA of the quantity of bits is obtained, and a VRB or PRB resource assigned to the multicast PDSCH is determined by using the RIV.

In the resource assignment method in this embodiment of this application, the quantity of FDRA bits in the multicast DCI is determined based on the predefined information or the first quantity of RBs, and the frequency domain resource assignment of the multicast PDSCH scheduled by the multicast DCI is determined based on the information corresponding to the FDRA of the quantity of bits, so that resource assignment of the multicast PDSCH is implemented.

Further, the determining a quantity of frequency domain resource assignment FDRA bits in multicast downlink control information DCI based on predefined information includes:
   determining the quantity of FDRA bits by using a predefined quantity of bits.

In other words, in this embodiment of this application, the quantity of FDRA bits in the multicast DCI may be predefined.

Further, the first quantity of RBs is a predefined quantity of RBs.

In some embodiments, the first quantity of RBs is a quantity of RBs corresponding to a target Control Resource Set (CORESET), and the target CORESET is a CORESET whose index number is 0, or the target CORESET is a CORESET in which the multicast DCI is located. The quantity of RBs corresponding to the target CORESET may also be represented as a size of bandwidth corresponding to the target CORESET.

In some embodiments, the first quantity of Ri3s is a quantity of RBs included in a carrier, or may be represented as a size of bandwidth corresponding to the carrier. In some embodiments, the first quantity of RBs is a quantity of RBs included in a carrier corresponding to a subcarrier spacing.

In some embodiments, the first quantity of RBs is a quantity of RBs included in a target BWP, or may be represented as a size of bandwidth corresponding to the target BWP, and the target BWP is an initial downlink BWP, or the target BWP is a BWP configured by a network side device for multicast PDSCH transmission.

Further, in a first implementation, the determining, based on information corresponding to FDRA of the quantity of bits, frequency domain resource assignment of a multicast physical downlink shared channel PDSCH scheduled by the multicast DCI includes:
   determining frequency domain resource assignment of the multicast PDSCH in a target BWP based on the information corresponding to the FDRA of the quantity of bits and a first RB; where
   the first RB is an RB with a smallest number in the target BWP, and the target BWP is an initial downlink BWP, or the target BWP is a BWP configured by a network side device for multicast PDSCH transmission.

For example, in a case that the first quantity of RBs is the BWP that is configured by the network side device and that is used for multicast PDSCH transmission, frequency domain resource assignment of the multicast PDSCH in a BWP configured by the network side device for multicast PDSCH transmission is determined. In other words, in a case that the target BWP is a BWP configured by the network side device for multicast PDSCH transmission, the quantity of FDRA bits is determined by using a quantity of RBs included in the BWP configured by the network side device for multicast PDSCH transmission.

In a case that the target BWP is an initial downlink BWP, the quantity of FDRA bits may be determined by using the predefined quantity of bits, a quantity of RBs included in the carrier, a quantity of RBs included in the initial downlink BWP, a quantity of RBs corresponding to a CORESET 0, or a quantity of RBs corresponding to a CORESET in which the multicast DCI is located.

Herein, in the first implementation, the bit quantity in the FDRA is determined based on a size of the initial downlink BWP, and frequency domain resource assignment of the multicast PDSCH is determined based on the information corresponding to the FDRA of the quantity of bits and the first RB, where the first RB is an RB with a smallest number in initial downlink BWPs. In some embodiments, frequency domain resource assignment of the multicast PDSCH may include an RB other than the initial downlink BWP. Herein, a transmission parameter of the multicast PDSCH may also be configured or predefined, for example, a resource assignment type, VRB-to-PRB mapping, and an RBG size.

Figure 3:
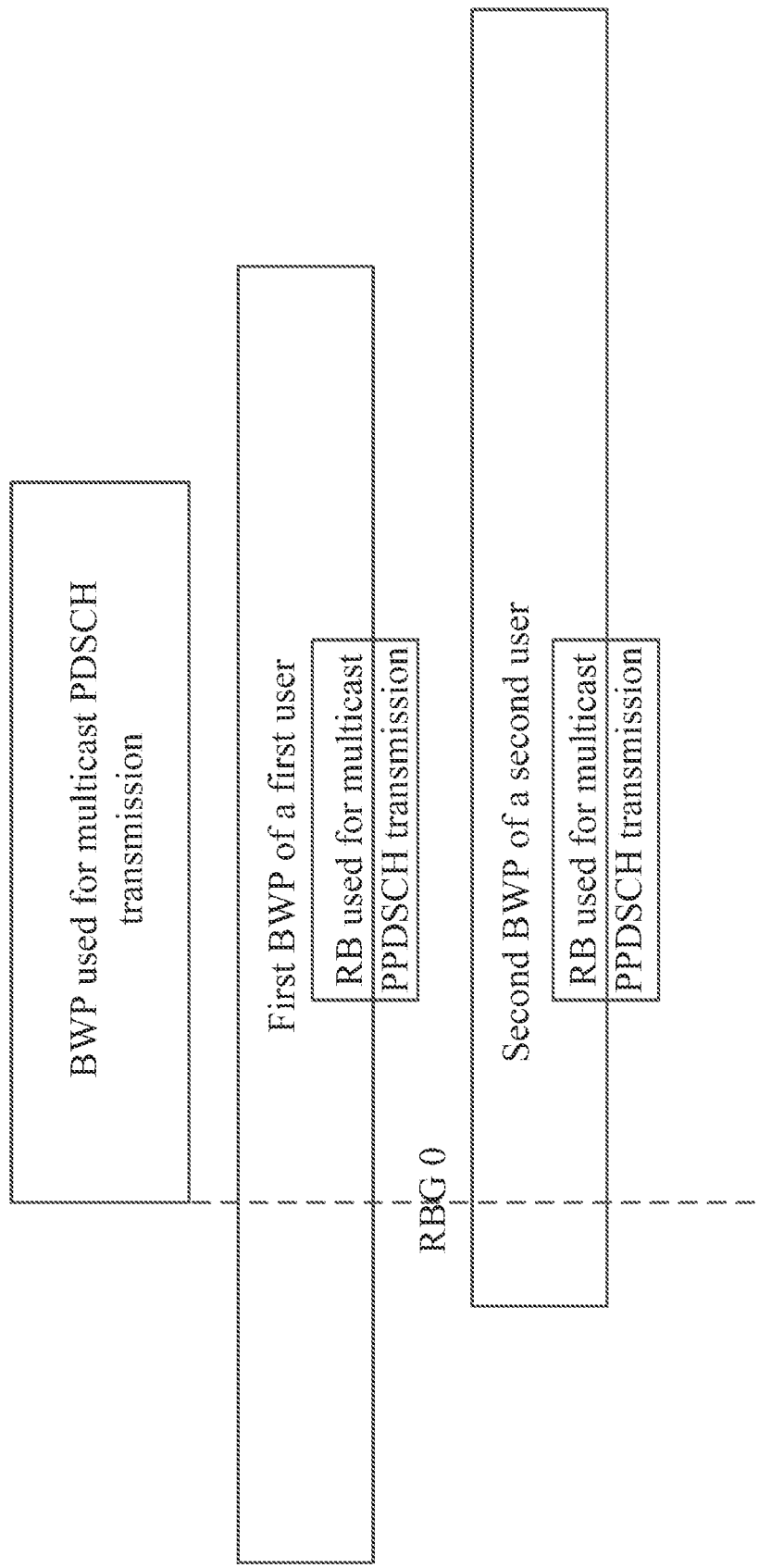
FIG. 3 is a first schematic diagram of resource assignment according to an embodiment of this application.

As shown in FIG. 3, a base station configures, by using higher layer signaling, a BWP used for multicast PDSCH transmission, where the higher layer signaling may be a BWP for GPDSCH, may be common signaling (for example, configured by using a SIB) or UE-specific signaling (for example, is configured by the base station for each UE that receives the multicast PDSCH). A configuration of the BWP may include a frequency domain location of the BWP and an SCS. In some embodiments, the base station may further configure parameters related to multicast PDSCH transmission, for example, configure a resource assignment type, VRB-to-PRB interleaving, and an RBG size by using a parameter gPDSCH-config. After receiving the multicast DCI, the UE determines, based on an FDRA indication in the DCI, the frequency domain resource assignment of the PDSCH scheduled by the DCI. The quantity of FDRA bits depends on a configuration of a BWP corresponding to the multicast PDSCH. The UE determines an assigned RB in the BWP corresponding to the multicast PDSCH, that is, RBs are numbered in the BWP corresponding to the multicast PDSCH.

Assuming that a frequency domain resource assignment type of the multicast PDSCH is a type 0, RBs in the BWP corresponding to the multicast PDSCH are assigned as multiple RBGs, and each RBG group includes P consecutive virtual RBs. A value of P is configured or predefined by the base station. A total quantity of RBGs in bandwidth may be obtained by using bandwidth and P. The DCI indicates, by using a bitmap of the FDRA, an RBG assigned to a UE PDSCH, and a quantity of bits in the bitmap is NRBG. Each bit in the bitmap is in a one-to-one correspondence with each RBG. When a value of the bit is 1, it indicates that an RBG corresponding to the bit is assigned to the UE.

Assuming that a frequency domain resource assignment type of the multicast PDSCH is a type 1, the UE determines, based on the quantity of RBs in the BWP corresponding to the PDSCH, a start RB number $RB_{start}$ indicated by the FDRA and a length $L_{RBs}$ of consecutively assigned VRBs, and RBs are assigned in the BWP corresponding to the PDSCH, that is, RBs start to be numbered from an RB with a smallest number in the BWP corresponding to the PDSCH. In addition, the first implementation may further include the following scenario: The first RB is an RB with a largest number in the target BWP, and the target BWP is an initial downlink BWP. In other words, the frequency domain resource assignment of the multicast PDSCH is determined based on an RB with a smallest number in the initial downlink BWP.

Further, in a second implementation, the determining, based on information corresponding to FDRA of the quantity of bits, frequency domain resource assignment of a multicast physical downlink shared channel PDSCH scheduled by the multicast DCI includes:
   determining frequency domain resource assignment of the multicast PDSCH based on the information corresponding to the FDRA of the quantity of bits and a second RB; where the second RB is an RB with a smallest number in RBs corresponding to a target CORESET, and the target CORESET is a CORESET whose index number is 0, or the target CORESET is a CORESET in which the multicast DCI is located.

In this implementation, for frequency resource assignment of the multicast PDSCH, RBs start to be numbered from a lowest RB in the target CORESET, and a physical resource assigned to the multicast PDSCH is determined by using VRB-to-PRB mapping. The UE determined an assigned VRB n according to an FDRA indication in the DCI. In VRB-to-PRB mapping, for multicast PDSCH transmission scheduled by the multicast DCI, the VRB n is mapped to a PRB m, where m=n+$N_{BWP}^{start}$, and $N_{BWP}^{start}$ represents a corresponding PRB with a smallest number in the target CORESET, or is a PRB with a smallest number in an RB in which a PDCCH corresponding to the multicast DCI is located.

Figure 4:
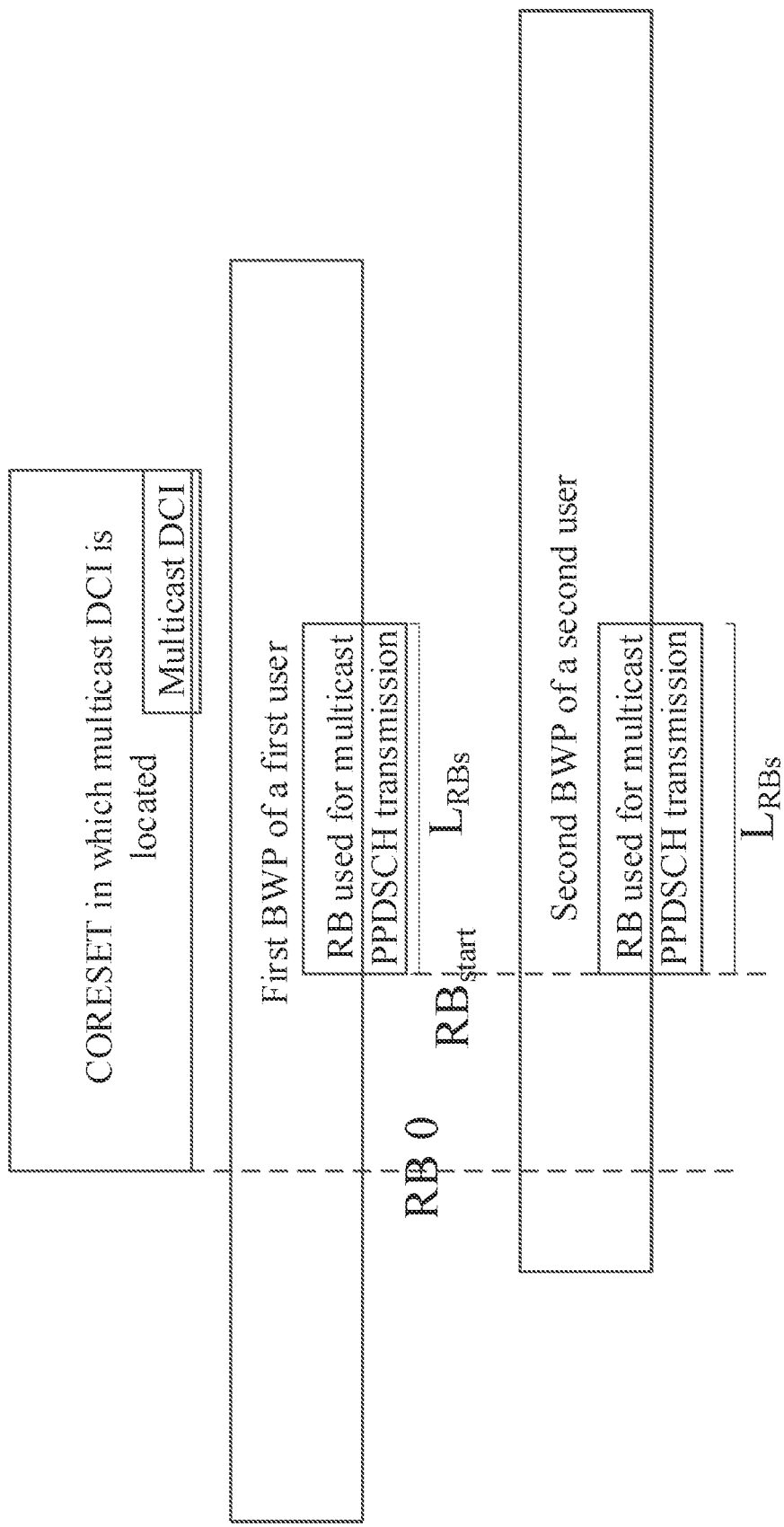
FIG. 4 is a second schematic diagram of resource assignment according to an embodiment of this application.

As shown in FIG. 4, it is assumed that the target CORESET is a CORESET in which the multicast DCI is located. After receiving the multicast DCI, the UE determines, based on the FDRA in the DCI, the frequency domain resource assignment of the PDSCH scheduled by the DCI. It is assumed that a resource assignment type of the multicast PDSCH is the type 1, and a value corresponding to the FDRA in the DCI is an RIV, which is used to indicate a number $RB_{start}$ of a start RB assigned to the UE PDSCH and a length $L_{RBs}$ of consecutively assigned VRBs. A calculation formula of the RIV is the same as the foregoing calculation formula of the RIV. After receiving the DCI, the UE interprets the RIV in the DCI based on a size of the BWP, to obtain values of $RB_{start}$ and $L_{RBs}$. Herein, the size of the BWP, that is, the quantity of RBs, is determined based on any one of the following:

a predefined quantity of RBs;
a quantity of RBs included in a carrier;
a quantity of RBs included in an initial BWP; and
a quantity of RBs included in BWP bandwidth configured by higher layer signaling.

In resource assignment of the multicast PDSCH, RBs start to be numbered from a lowest RB in a CORESET in which the multicast DCI is located; in other words, a number of the RB with the smallest number in a CORESET in which the DCI is located is 0, and a value of $RB_{start}$ represents an index of a start RB, that is, indicates that the start RB is an $(RB_{start})^{th}$ RB that starts to be numbered from the lowest RB in the CORESET in which the DCI is located. A value of $L_{RBs}$ indicates a quantity of RBs consecutively assigned from the start RB.

Figure 5:
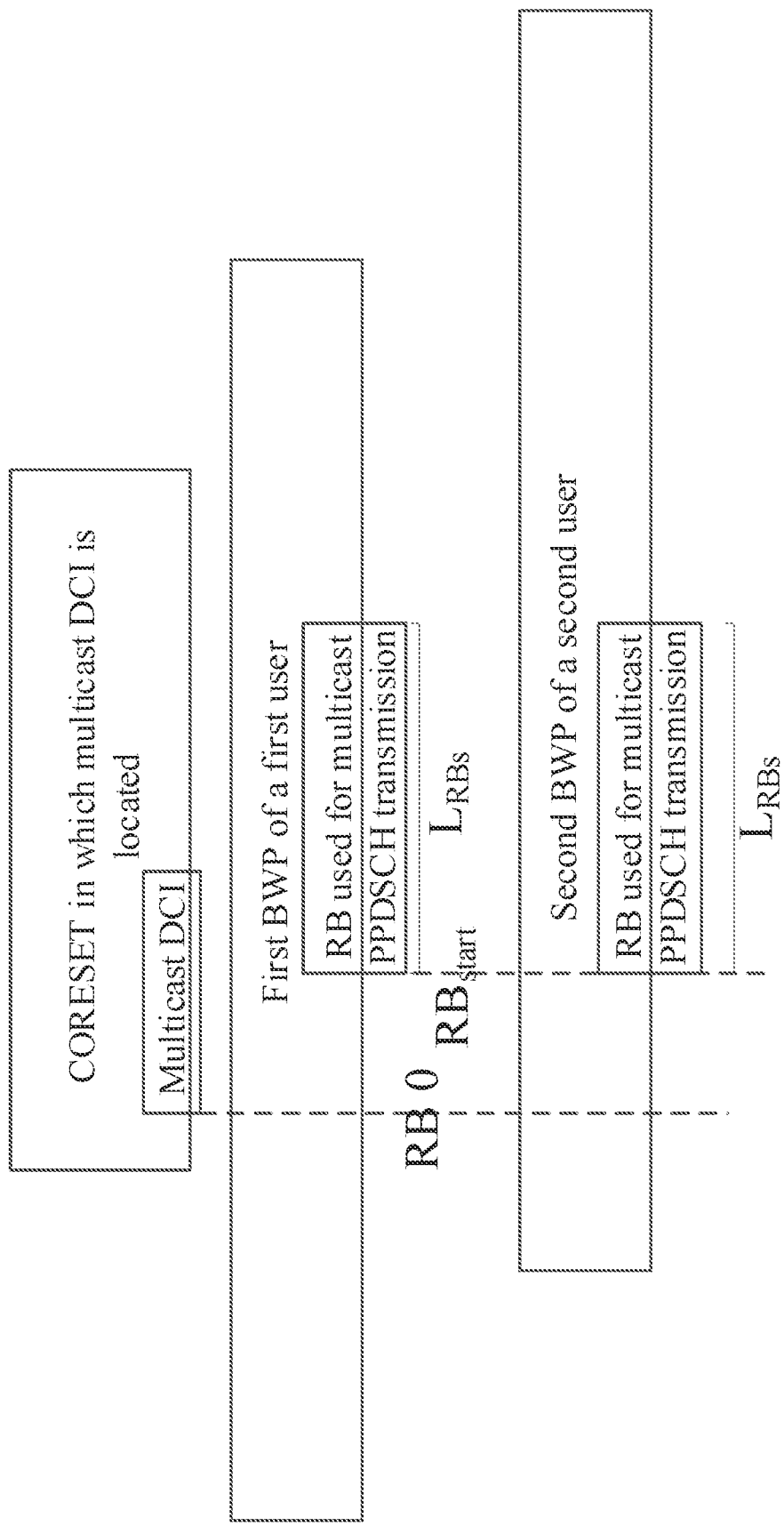
FIG. 5 is a third schematic diagram of resource assignment according to an embodiment of this application.

In some embodiments, as shown in FIG. 5, in resource assignment of the multicast PDSCH, RBs start to be numbered from a lowest RB in a PDSCH in which the DCI is located; in other words, a number of the RB with the smallest number in the PDCCH corresponding to the DCI is 0, and a value of $RB_{start}$ represents an index of a start RB, that is, indicates that the start RB is an $(RB_{start})^{th}$ RB that starts to be numbered from a lowest RB in an RB in which the PDCCH corresponding to the DCI is located. A value of $L_{RBs}$ indicates a quantity of RBs consecutively assigned from the start RB.

For example, in this implementation, a resource assignment type of the multicast PDSCH, VRB-to-PRB mapping, an RBG size, and the like may be predefined or configured by using higher layer signaling. For example, the PDSCH scheduled by the multicast DCI only supports resource assignment of the type 0, and does not support interleaved VRB-to-PRB mapping.

For example, in this implementation, the terminal determines the quantity of FDRA bits based on the quantity of RBs included in the bandwidth of the carrier, the quantity of RBs included in the initial downlink bandwidth, the quantity of RBs corresponding to the CORESET 0, the predefined quantity of bits, or the quantity of RBs corresponding to the CORESET in which the multicast DCI is located.

Further, in a third implementation, the determining, based on information corresponding to FDRA of the quantity of bits, frequency domain resource assignment of a multicast physical downlink shared channel PDSCH scheduled by the multicast DCI includes:

determining frequency domain resource assignment of the multicast PDSCH in a carrier based on the information corresponding to the FDRA of the quantity of bits and a third RB; where the third RB is an RB with a smallest number in the carrier (that is, a common RB 0).

Figure 6:
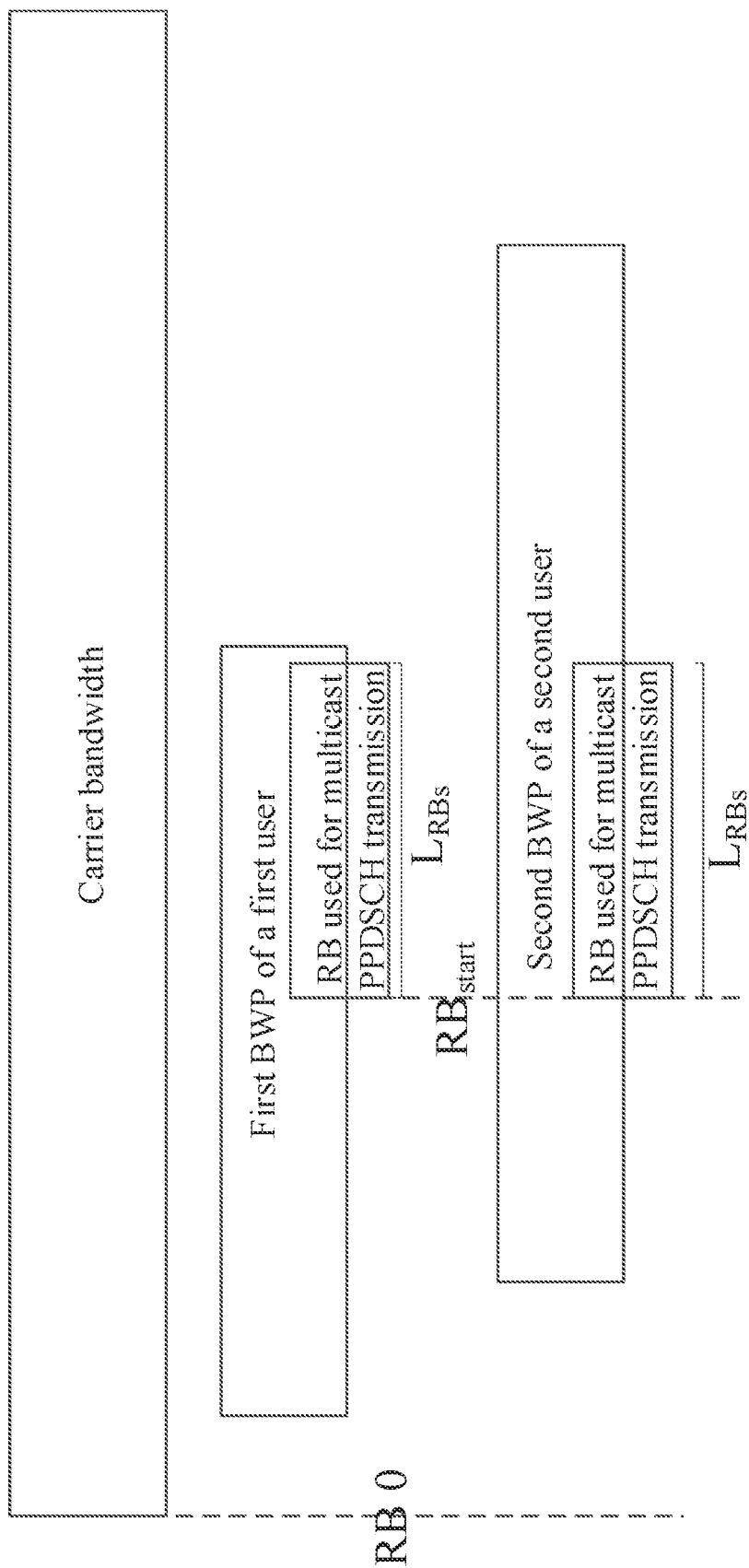
FIG. 6 is a fourth schematic diagram of resource assignment according to an embodiment of this application.

As shown in FIG. 6, after receiving the multicast DCI, the UE determines, according to an FDRA indication in the DCI, the frequency domain resource assignment of the PDSCH scheduled by the DCI. It is assumed that a resource assignment type of the multicast PDSCH is the type 1, and a value corresponding to the FDRA in the DCI is an RIV, which is used to indicate a number $RB_{start}$ of a start RB assigned to the UE PDSCH and a length $L_{RBs}$ of consecutively assigned VRBs. A calculation formula of the RIV is the same as the foregoing calculation formula of the RIV. After receiving the DCI, the UE interprets the RIV in the DCI based on a size of the BWP, to obtain values of $RB_{start}$ and $L_{RBs}$. Herein, a size of the BWP may be determined based on a bandwidth size of a carrier, a carrier bandwidth size corresponding to a subcarrier spacing, a size of an initial downlink BWP, or the like.

In resource assignment of the multicast PDSCH, RBs start to be numbered from a lowest RB (point A) of a carrier, in other words, a number of the lower RB in the carrier is 0. If a value of $RB_{start}$, it indicates that the start RB is an $(RB_{start})^{th}$ RB that starts to be numbered from the lowest RB in the carrier. A value of $L_{RBs}$ indicates a quantity of RBs consecutively assigned from the start RB.

For example, in this method, for each UE that receives the multicast PDSCH, a PRB assigned by the multi cast PDSCH should be included in an active downlink (DL) BWP of the UE; in other words, the UE does not expect any PRB assigned by the multicast PDSCH to be outside an active BWP of the UE.

For example, in this implementation, the terminal determines the quantity of FDRA bits based on the quantity of RBs included in the bandwidth of the carrier, the quantity of RBs included in the initial downlink bandwidth, the quantity of RBs corresponding to the CORESET 0, the predefined quantity of bits, or the quantity of RBs corresponding to the CORESET in which the multicast DCI is located.

Further, in a fourth implementation, the determining, based on information corresponding to FDRA of the quantity of bits, frequency domain resource assignment of a multicast physical downlink shared channel PDSCH scheduled by the multicast DCI includes:

determining frequency domain resource assignment of the multicast PDSCH in a carrier based on the information corresponding to the FDRA of the quantity of bits and a fourth RB; where The fourth RB is configured by a base station. For example, the base station configures that the fourth RB is a common RB 0, or is an RB with a lowest number in an initial BWP, or is an RB with a smallest number in a CORSET in which DCI is located. Further, before the determining, based on information corresponding to FDRA of the quantity of bits, frequency domain resource assignment of a multi cast physical downlink shared channel PDSCH scheduled by the multicast the method further includes:

obtaining a predefined resource assignment type; or
obtaining a resource assignment type by using higher layer signaling.

Herein, a resource assignment type may be the type 0, the type 1, or a dynamically indicated type 0 or type 1.

Further, before the determining, based on information corresponding to FDRA of the quantity of bits, frequency domain resource assignment of a multicast physical downlink shared channel PDSCH scheduled by the multicast DCI, the method further includes:

obtaining a predefined resource block group RBG size; or
obtaining an RBG size by using higher layer signaling.

In some embodiments, in a case that the resource assignment type is the type 0, an RBG size is obtained.

In addition, in this embodiment of this application, time domain resource assignment is described as follows:

For a PDSCH scheduled by DCI scrambled by a g-RNTI, a time domain resource assignment TDRA value m indicates an $(m+1)^{th}$ row in a corresponding resource assignment table, where the corresponding resource assignment table is a predefined table or a table configured by using higher layer signaling, and the higher layer signaling may be common or UE-specific, for example, is configured by using a SIB or is UE-specific (for example, is configured by the base station for each UE that receives the multicast PDSCH). For example, a PDSCH Time Domain Allocation table is configured by using a parameter gPDSCH-config.

In the resource assignment method in this embodiment of this application, the quantity of FDRA bits in the multicast DCI is determined based on the predefined information or the first quantity of RBs, and the frequency domain resource assignment of the multicast PDSCH scheduled by the multicast DCI is determined based on the information corresponding to the FDRA of the quantity of bits, so that resource assignment of the multicast PDSCH is implemented, and validity of a communication system is improved.

Figure 7:
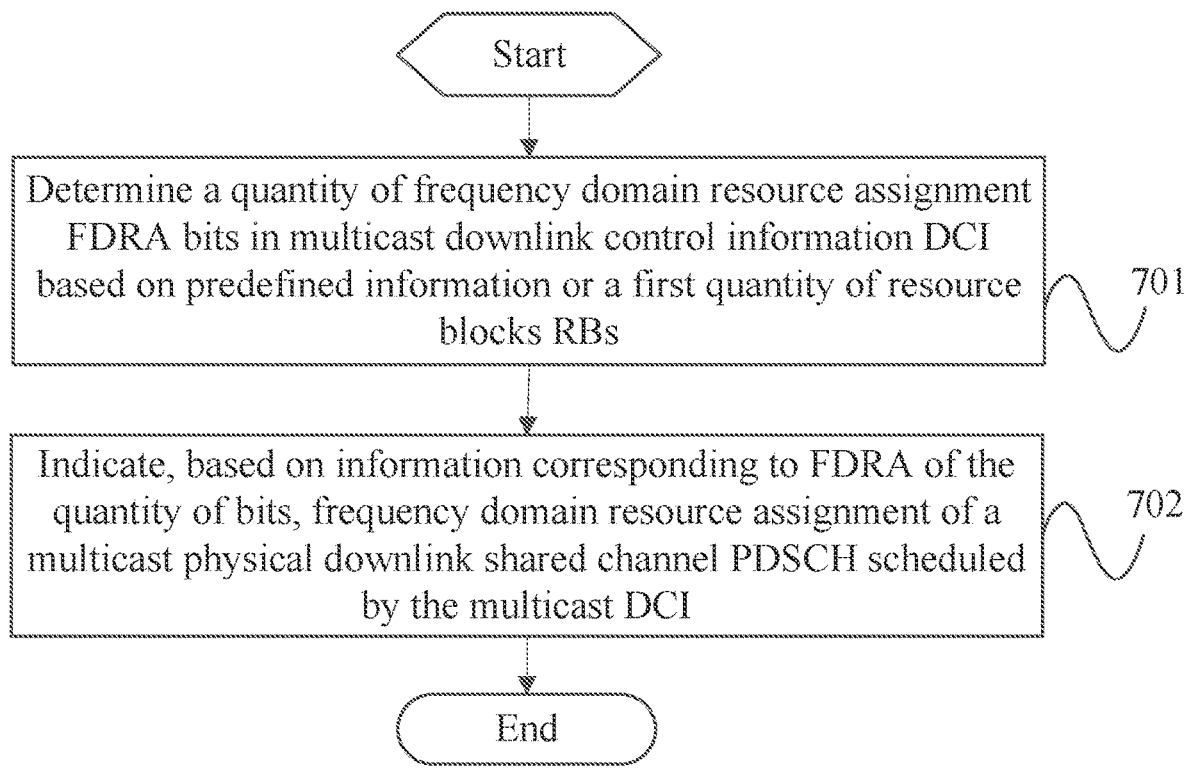
FIG. 7 is a second schematic flowchart of a resource assignment method according to an embodiment of this application.

As shown in FIG. 7, an embodiment of this application further provides a resource assignment method. The resource assignment method is applied to a network side device and includes:

Step 701: Determine a quantity of bits of frequency domain resource assignment FDRA in multicast downlink control information DCI based on predefined information or a first quantity of resource blocks RBs.

In this embodiment of this application, for resource assignment of a type 0, a quantity of bits in FDRA is related to a quantity of RBGs included in a BWP, and the quantity of RBGs is related to a quantity of RBs and an RBG size. DL resource assignment of a type 1 is related to a quantity of RBs included in the BWP. In other words, in the two types of resource assignment, the quantity of bits in FDRA is related to the quantity of RBs. Herein, the quantity of bits in FDRA in the multicast DCI may be indicated by using the foregoing first quantity of RBs. The foregoing predefined information may be a predefined quantity of bits.

In this embodiment of this application, the quantity of bits in FDRA in the multicast DCI is indicated, so that a terminal can obtain information corresponding to the quantity of bits in FDRA, and further, frequency domain resource assignment of a PDSCH scheduled by the multicast DCI can be determined.

Step 702: Indicate, based on information corresponding to FDRA of the quantity of bits, frequency domain resource assignment of a multicast physical downlink shared channel PDSCH scheduled by the multicast DCI.

The foregoing frequency domain resource may be a PRB or a VRB. In some embodiments, for a resource assignment type 0, an RBG assigned to the multicast PDSCH is indicated by using a bitmap of the FDRA of the quantity of bits. For a resource assignment type 1, a VRB or PRB resource assigned to the multicast PDSCH is determined by using a value RIV corresponding to the FDRA of the quantity of bits.

In the resource assignment method in this embodiment of this application, the quantity of FDRA bits in the multicast DCI is indicated based on the predefined information or the first quantity of RBs, and the frequency domain resource assignment of the multicast PDSCH scheduled by the multicast DCI is indicated based on the information corresponding to the FDRA of the quantity of bits, so that resource assignment of the multicast PDSCH is implemented.

Further, the indicating a quantity of frequency domain resource assignment FDRA bits in multicast downlink control information DCI based on predefined information includes:

determining the quantity of FDRA bits by using a predefined quantity of bits.

Further, the first quantity of RBs is a predefined quantity of RBs.

In some embodiments, the first quantity of RBs is a quantity of RBs corresponding to a target CORESET, and the target CORESET is a CORESET whose index number is 0, or the target CORESET is a CORESET in which the multicast DCI is located. The quantity of RBs corresponding to the target CORESET may also be represented as a size of bandwidth corresponding to the target CORESET.

In some embodiments, the first quantity of RBs is a quantity of RBs included in a carrier, or may be represented as a size of bandwidth corresponding to the carrier.

In some embodiments, the first quantity of RBs is a quantity of RBs included in a target BWP, or may be represented as a size of bandwidth corresponding to the target BWP, and the target BWP is an initial downlink BWP, or the target BWP is a BWP configured by a network side device for multicast PDSCH transmission.

Further, the indicating, based on information corresponding to FDRA of the quantity of bits, frequency domain resource assignment of a multicast physical downlink shared channel PDSCH scheduled by the multicast DCI includes:

indicating frequency domain resource assignment of the multicast PDSCH in a target BWP based on the information corresponding to the FDRA of the quantity of bits and a first RB; where
the first RB is an RB with a smallest number in the target BWP, and the target BWP is an initial downlink BWP, or the target BWP is a BWP configured by a network side device for multicast PDSCH transmission.

Further, the indicating, based on information corresponding to FDRA of the quantity of bits, frequency domain resource assignment of a multicast physical downlink shared channel PDSCH scheduled by the multicast DCI includes:

indicating frequency domain resource assignment of the multicast PDSCH based on the information corresponding to the FDRA of the quantity of bits and a second RB; where
the second RB is an RB with a smallest number in RBs corresponding to a target CORESET, and the target CORESET is a CORESET whose index number is 0, or the target CORESET is a CORESET in which the multicast DCI is located.

Further, the indicating, based on information corresponding to FDRA of the quantity of bits, frequency domain resource assignment of a multicast physical downlink shared channel PDSCH scheduled by the multicast DCI includes:
indicating frequency domain resource assignment of the multicast PDSCH in a carrier based on the information corresponding to the FDRA of the quantity of bits and a third RB; where
the third RB is an RB with a smallest number in the carrier.

Further, the method further includes:
indicating a resource assignment type through predefining or by using higher layer signaling.

Further, the method further includes:
indicating a resource block group RBG size through predefining or by using higher layer signaling.

It should be noted that the resource assignment method applied to the network side device is a method corresponding to the foregoing resource assignment method applied to a terminal side, and details are not described herein again.

In the resource assignment method in this embodiment of this application, the quantity of FDRA bits in the multicast DCI is determined based on the predefined information or the first quantity of RBs, and the frequency domain resource assignment of the multicast PDSCH scheduled by the multicast DCI is indicated based on the information corresponding to the FDRA of the quantity of bits, so that resource assignment of the multicast PDSCH is implemented.

It should be noted that, the resource assignment method provided in this embodiment of this application may be performed by a resource assignment apparatus or a control module that is in the resource assignment apparatus and that is configured to perform the resource assignment method. In the embodiments of this application, the resource assignment apparatus provided in the embodiments of this application is described by using an example in which the resource assignment apparatus performs the resource assignment method.

Figure 8:
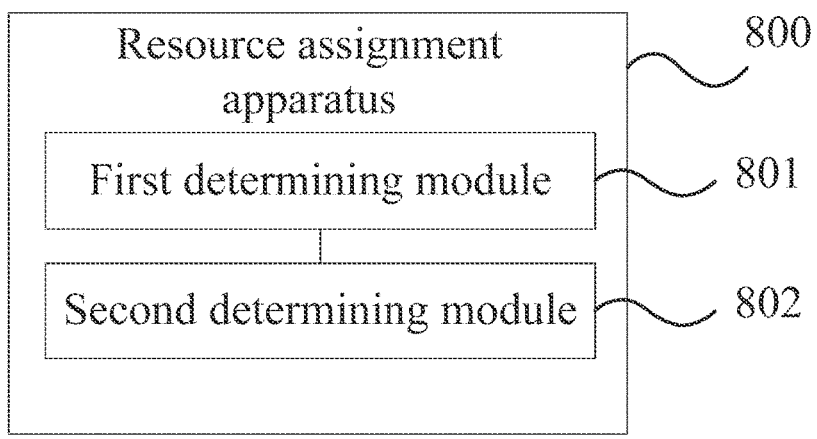
FIG. 8 is a first schematic diagram of modules of a resource assignment apparatus according to an embodiment of this application.

As shown in FIG. 8, an embodiment of this application further provides a resource assignment apparatus 800. The resource assignment apparatus is applied to a terminal and includes:
a first determining module 801, configured to determine a quantity of bits of frequency domain resource assignment FDRA in multicast downlink control information DCI based on predefined information or a first quantity of resource blocks RBs; and
a second determining module 802, configured to determine, based on information corresponding to FDRA of the quantity of bits, frequency domain resource assignment of a multicast physical downlink shared channel PDSCH scheduled by the multi cast DCI.

In the resource assignment apparatus in this embodiment of this application, the first determining module is configured to determine the quantity of FDRA bits by using a predefined quantity of bits.

In the resource assignment apparatus in this embodiment of this application, the first quantity of RBs is a predefined quantity of RBs; or
the first quantity of RBs is a quantity of RBs corresponding to a target CORESET, and the target CORESET is a CORESET whose index number is 0, or the target CORESET is a CORESET in which the multicast DCI is located; or
the first quantity of RBs is a quantity of RBs included in a carrier; or
the first quantity of RBs is a quantity of RBs included in a target BWP, and the target BWP is an initial downlink BWP, or the target BWP is a BWP configured by a network side device for multicast PDSCH transmission.

In the resource assignment apparatus in this embodiment of this application, the second determining module is configured to determine frequency domain resource assignment of the multicast PDSCH in a target BWP based on information corresponding to FDRA of the quantity of bits and a first RB; where
the first RB is an RB with a smallest number in the target BWP, and the target BWP is an initial downlink BWP, or the target BWP is a BWP configured by a network side device for multicast PDSCH transmission.

In the resource assignment apparatus in this embodiment of this application, the second determining module is configured to determine frequency domain resource assignment of the multicast PDSCH based on information corresponding to FDRA of the quantity of bits and a second RB; where
the second RB is an RB with a smallest number in RBs corresponding to a target CORESET, and the target CORESET is a CORESET whose index number is 0, or the target CORESET is a CORESET in which the multicast DCI is located.

In the resource assignment apparatus in this embodiment of this application, the second determining module is configured to determine frequency domain resource assignment of the multicast PDSCH in a carrier based on information corresponding to FDRA of the quantity of bits and a third RB; where
the third RB is an RB with a smallest number in the carrier.

The resource assignment apparatus in this embodiment of this application further includes:
a first obtaining module, configured to: before the second determining module determines, based on the information corresponding to the FDRA of the quantity of bits, the frequency domain resource assignment of the multicast physical downlink shared channel PDSCH scheduled by the multicast DCI, obtain a predefined resource assignment type or obtain a resource assignment type by using higher layer signaling.

The resource assignment apparatus in this embodiment of this application further includes:
a second obtaining module, configured to: before the second determining module determines, based on the information corresponding to the FDRA of the quantity of bits, the frequency domain resource assignment of the multicast physical downlink shared channel PDSCH scheduled by the multicast DCI, obtain a predefined resource block group RBG size or obtain an RBG size by using higher layer signaling.

In the resource assignment apparatus in this embodiment of this application, the quantity of FDRA bits in the multicast DCI is determined based on the predefined information or the first quantity of RBs, and the frequency domain resource assignment of the multicast PDSCH scheduled by the multicast DCI is determined based on the information corresponding to the FDRA of the quantity of bits, so that resource assignment of the multicast PDSCH is implemented.

The resource assignment apparatus in this embodiment of this application may be an apparatus, or may be a component, an integrated circuit, or a chip in a terminal. The apparatus may be a mobile terminal, or may be a non-mobile terminal. For example, the mobile terminal may include but is not limited to the foregoing listed types of terminals 11. The non-mobile terminal may be a server, a Network Attached Storage (NAS), a Personal Computer (PC), a Television (TV), a teller machine, or a self-service machine. This is not limited in this embodiment of this application.

The resource assignment apparatus in this embodiment of this application may be an apparatus with an operating system. The operating system may be an Android operating system, may be an iOS operating system, or may be another possible operating system. This is not limited in this embodiment of this application.

The resource assignment apparatus provided in this embodiment of this application can implement processes implemented in the method embodiments of FIG. 1 to FIG. 6, and a same technical effect is achieved. To avoid repetition, details are not described herein again.

Figure 9:
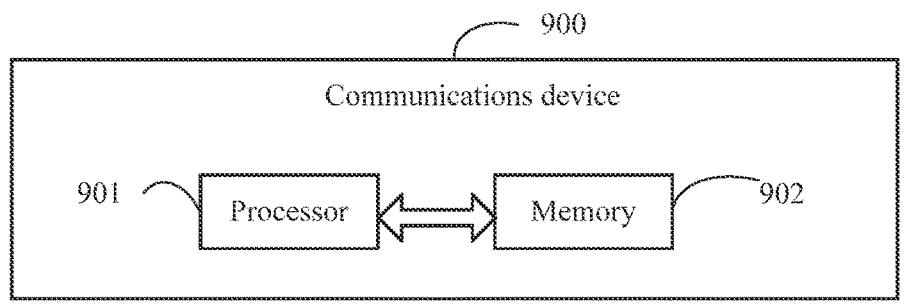
FIG. 9 is a structural block diagram of a communication device according to an embodiment of this application.

For example, as shown in FIG. 9, an embodiment of this application further provides a communication device 900, including a processor 901, a memory 902, a program or an instruction that is stored in the memory 902 and that can run on the processor 901. For example, when the communication device 900 is a terminal, the program or the instruction is executed by the processor 901 to implement processes of the embodiment of the foregoing resource assignment method applied to the terminal, and a same technical effect can be achieved. When the communication device 900 is a network side device, when the program or the instruction is executed by the processor 901, processes of the embodiment of the foregoing resource assignment method applied to the network side device are implemented, and a same technical effect can be achieved. To avoid repetition, details are not described herein again.

Figure 10:
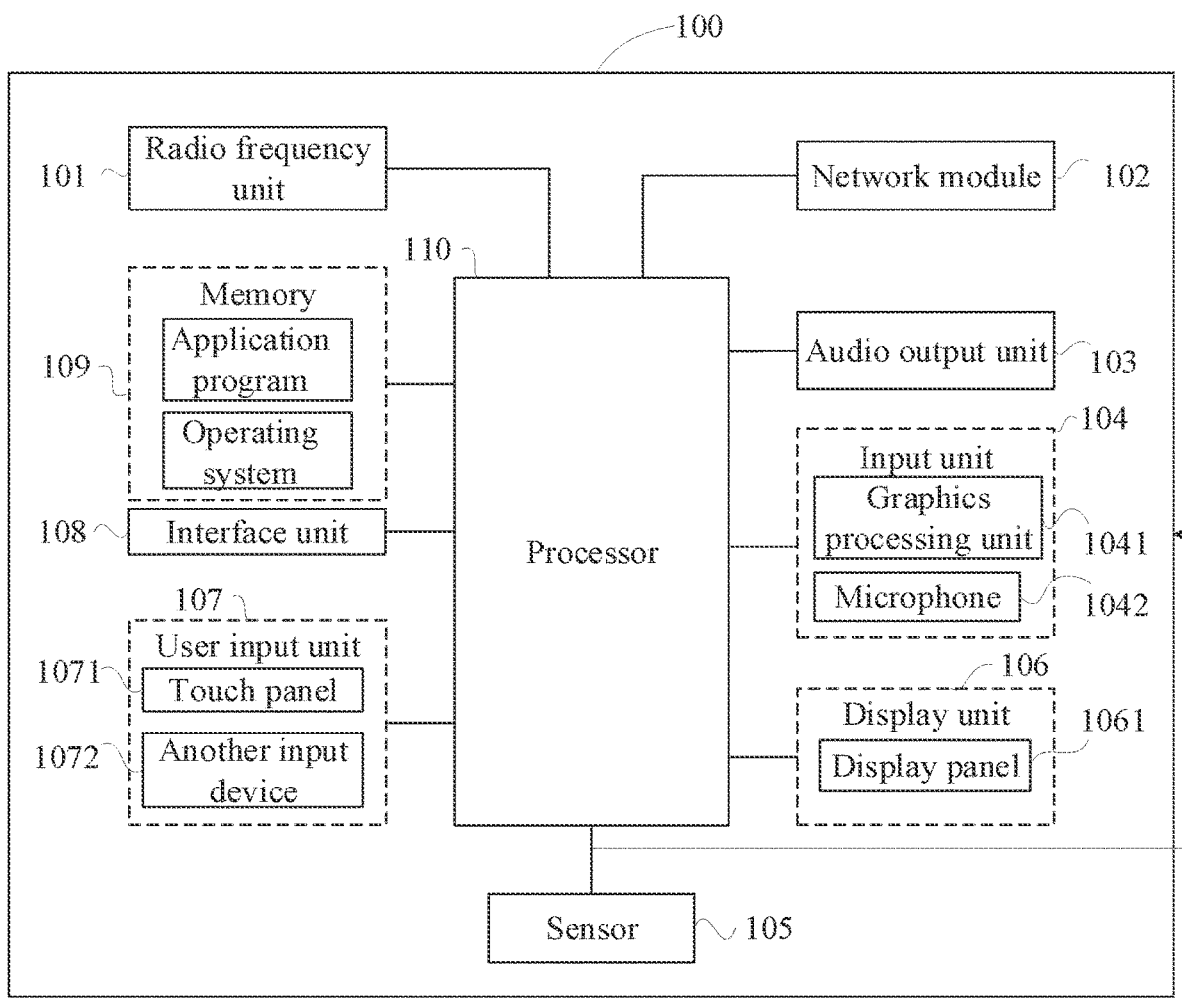
FIG. 10 is a structural block diagram of a terminal according to an embodiment of this application.

FIG. 10 is a schematic diagram of a hardware structure of a terminal according to an embodiment of this application.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

It may be understood by a person skilled in the art that the terminal 100 may further include a power supply (such as a battery) that supplies power to each component. The power supply may be logically connected to the processor 110 by using a power management system, to implement functions such as charging, discharging, and power consumption management by using the power management system. A structure of the terminal shown in FIG. 10 does not constitute a limitation on the terminal device, and may include more or fewer parts than those shown in the figure, or combine some parts, or have different part arrangements. Details are not described herein again.

It should be understood that, in this embodiment of this application, the input unit 104 may include a Graphics Processing Unit (GPU) 1041 and a microphone 1042. The graphics processing unit 1041 processes image data of a static picture or a video obtained by an image capture apparatus (such as a camera) in a video capture mode or an image capture mode. The display unit 106 may include a display panel 1061, and the display panel 1061 may be configured in a form of a liquid crystal display, an organic light emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to one or more of a physical keyboard, a function key (such as a volume control key or an on/off key), a trackball, a mouse, a joystick, and the like. Details are not described herein.

In this embodiment of this application, after receiving downlink data from a network side device, the radio frequency unit 101 sends the downlink data to the processor 110 for processing, and sends uplink data to the network side device. Generally, the radio frequency unit 101 includes but is not limited to an antenna, at least one amplifier, a transceiver, a coupler, a low noise amplifier, a duplexer, and the like.

The memory 109 may be configured to store a software program or an instruction and various data. The memory 109 may mainly include a storage program or instruction area and a storage data area, where the storage program or instruction area may store an operating system, an application program or an instruction required by at least one function (such as a sound play function or an image play function), and the like. In addition, the memory 109 may include a high-speed random access memory, and may further include a non-volatile memory. The non-volatile memory may be a Read-only Memory (ROM), a Programmable ROM (PROM), an Erasable PROM (EPROM), an Electrically EPROM (EEPROM), or a flash memory, for example, at least one magnetic disk storage device, a flash memory device, or another non-volatile solid-state storage device.

The processor 110 may include one or more processing units. In some embodiments, the processor 110 may be integrated with an application processor and a modem processor. The application processor mainly processes an operating system, a user interface, an application program or an instruction, and the like, and the modem processor mainly processes wireless communication, for example, a baseband processor. It may be understood that the modem processor may also not be integrated into the processor 110.

The processor 110 is configured to: determine a quantity of frequency domain resource assignment FDRA bits in multicast downlink control information DCI based on predefined information or a first quantity of resource blocks RBs; and determine, based on information corresponding to FDRA of the quantity of bits, frequency domain resource assignment of a multicast physical downlink shared channel PDSCH scheduled by the multicast DCI.

In the terminal in this embodiment of this application, the quantity of FDRA bits in the multicast DCI is determined based on the predefined information or the first quantity of RBs, and the frequency domain resource assignment of the multicast PDSCH scheduled by the multicast DCI is determined based on the information corresponding to the FDRA of the quantity of bits, so that resource assignment of the multi cast PDSCH is implemented.

In some embodiments, the processor 110 is further configured to determine the quantity of FDRA bits by using a predefined quantity of bits.

In some embodiments, the first quantity of RBs is a predefined quantity of RBs; or the first quantity of RBs is a quantity of RBs corresponding to a target CORESET, and the target CORESET is a CORESET whose index number is 0, or the target CORESET is a CORESET in which the multicast DCI is located; or the first quantity of RBs is a quantity of RBs included in a carrier; or the first quantity of RBs is a quantity of RBs included in a target BWP, and the target BWP is an initial downlink BWP, or the target BWP is a BWP configured by a network side device for multicast PDSCH transmission.

In some embodiments, the processor 110 is further configured to determine frequency domain resource assignment of the multi cast PDSCH in a target BWP based on the information corresponding to the FDRA of the quantity of bits and a first RB; where the first RB is an RB with a smallest number in the target BWP, and the target BWP is an initial downlink BWP, or the target BWP is a BWP configured by a network side device for multicast PDSCH transmission.

In some embodiments, the processor 110 is further configured to determine frequency domain resource assignment of the multicast PDSCH based on the information corresponding to the FDRA of the quantity of bits and a second RB; where the second RB is an RB with a smallest number in RBs corresponding to a target CORESET, and the target CORESET is a CORESET whose index number is 0, or the target CORESET is a CORESET in which the multicast DCI is located.

In some embodiments, the processor 110 is further configured to determine frequency domain resource assignment of the multicast PDSCH in a carrier based on the information corresponding to the FDRA of the quantity of bits and a third RB; where the third RB is an RB with a smallest number in the carrier.

In some embodiments, the processor 110 is further configured to obtain a predefined resource assignment type; or obtain a resource assignment type by using higher layer signaling.

In some embodiments, the processor 110 is further configured to obtain a predefined resource block group RBG size, or obtain an RBG size by using higher layer signaling.

In the terminal in this embodiment of this application, the quantity of FDRA bits in the multicast DCI is determined based on the predefined information or the first quantity of RBs, and the frequency domain resource assignment of the multicast PDSCH scheduled by the multicast DCI is determined based on the information corresponding to the FDRA of the quantity of bits, so that resource assignment of the multi cast PDSCH is implemented.

Figure 11:
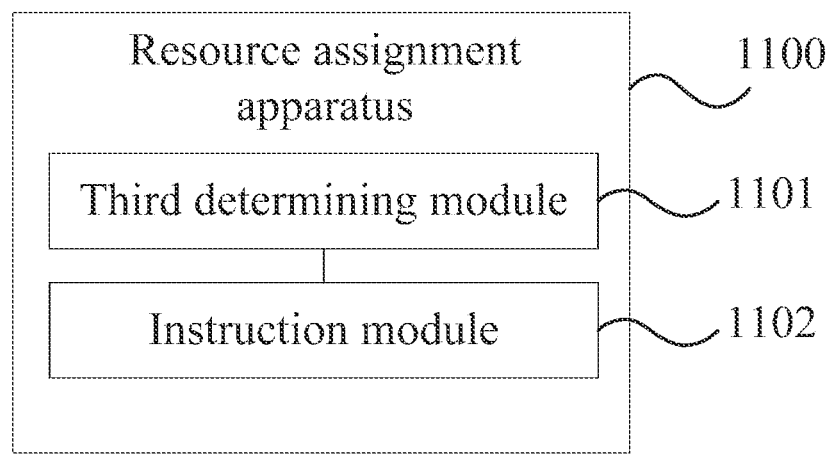
FIG. 11 is a second schematic diagram of modules of a resource assignment apparatus according to an embodiment of this application.

As shown in FIG. 11, an embodiment of this application further provides a resource assignment apparatus 1100. The resource assignment apparatus is applied to a network side device and includes:

a third determining module 1101, configured to determine a quantity of bits of frequency domain resource assignment FDRA in multicast downlink control information DCI based on predefined information or a first quantity of resource blocks RBs; and an indication module 1102, configured to indicate, based on information corresponding to FDRA of the quantity of bits, frequency domain resource assignment of a multicast physical downlink shared channel PDSCH scheduled by the multi cast DCI.

In the resource assignment apparatus in this embodiment of this application, the third determining module is configured to determine the quantity of FDRA bits by using a predefined quantity of bits.

In the resource assignment apparatus in this embodiment of this application, the first quantity of RBs is a predefined quantity of RBs; or the first quantity of RBs is a quantity of RBs corresponding to a target CORESET, and the target CORESET is a CORESET whose index number is 0, or the target CORESET is a CORESET in which the multicast DCI is located; or the first quantity of RBs is a quantity of RBs included in a carrier; or the first quantity of RBs is a quantity of RBs included in a target BWP, and the target BWP is an initial downlink BWP, or the target BWP is a BWP configured by a network side device for multicast PDSCH transmission.

In the resource assignment apparatus in this embodiment of this application, the indication module is configured to indicate frequency domain resource assignment of the multicast in a target BWP based on information corresponding to FDRA of the quantity of bits and a first RB; where the first RB is an RB with a smallest number in the target BWP, and the target BWP is an initial downlink BWP, or the target BWP is a BWP configured by a network side device for multicast PDSCH transmission.

In the resource assignment apparatus in this embodiment of this application, the indication module is configured to indicate frequency domain resource assignment of the multicast PDSCH based on information corresponding to FDRA of the quantity of bits and a second RB; where the second RB is an RB with a smallest number in RBs corresponding to a target CORESET, and the target CORESET is a CORESET whose index number is 0, or the target CORESET is a CORESET in which the multicast DCI is located.

In the resource assignment apparatus in this embodiment of this application, the indication module is configured to indicate frequency domain resource assignment of the multicast in a carrier based on information corresponding to FDRA of the quantity of bits and a third RB; where the third RB is an RB with a smallest number in the carrier.

The resource assignment apparatus in this embodiment of this application further includes:

a third indication module, configured to indicate a resource assignment type through predefining or by using higher layer signaling.

The resource assignment apparatus in this embodiment of this application further includes:

a third indication module, configured to indicate a type of a resource block group RBG through predefining or by using higher layer signaling.

The resource assignment apparatus provided in this embodiment of this application can implement processes implemented in the embodiment of the resource assignment method, and a same technical effect is achieved. To avoid repetition, details are not described herein again.

In the resource assignment apparatus in this embodiment of this application, the quantity of FDRA bits in the multicast DCI is determined based on the predefined information or the first quantity of RBs, and the frequency domain resource assignment of the multicast PDSCH scheduled by the multicast DCI is indicated based on the information corresponding to the FDRA of the quantity of bits, so that resource assignment of the multicast PDSCH is implemented.

Figure 12:
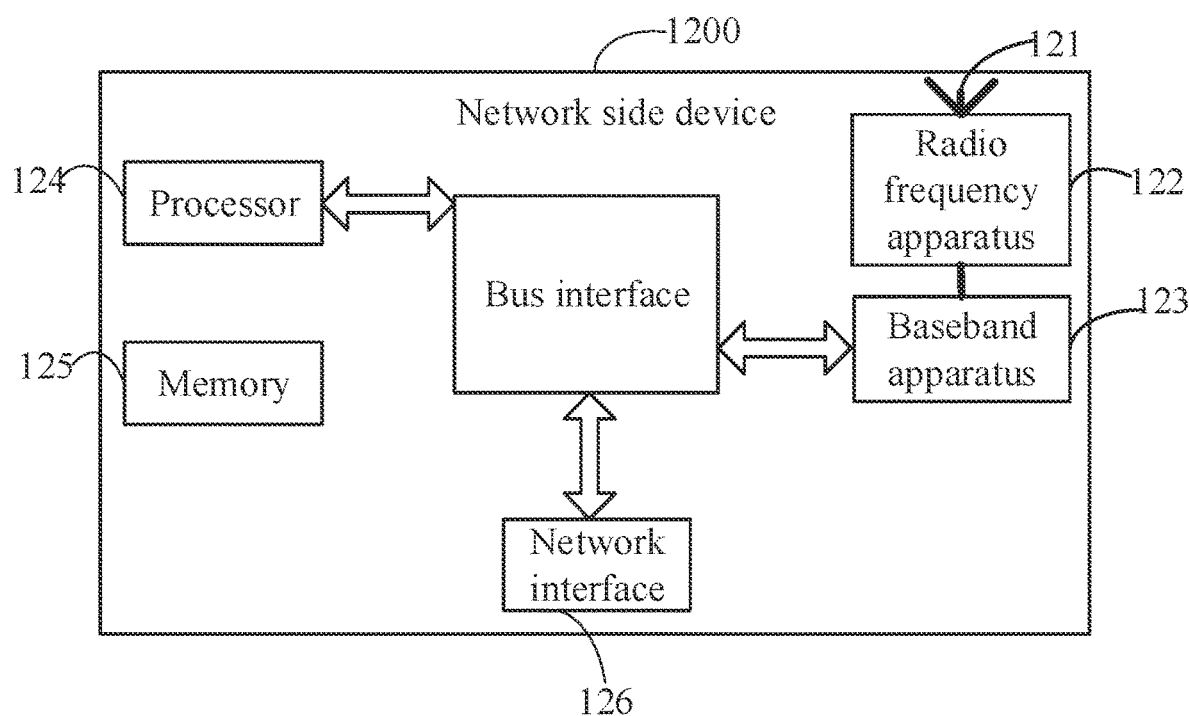
FIG. 12 is a structural block diagram of a network side device according to an embodiment of this application.

For example, an embodiment of this application further provides a network side device. As shown in FIG. 12, the network side device 1200 includes an antenna 121, a radio frequency apparatus 122, and a baseband apparatus 123. The antenna 121 is connected to the radio frequency apparatus 122. In an uplink direction, the radio frequency apparatus 122 receives information by using the antenna 121, and sends the received information to the baseband apparatus 123 for processing. In a downlink direction, the baseband apparatus 123 processes to-be-sent information, and sends the to-be-sent information to the radio frequency apparatus 122. After processing the received information, the radio frequency apparatus 122 sends the information by using the antenna 121.

The foregoing band processing apparatus may be located in the baseband apparatus 123. In the foregoing embodiment, a method performed by the network side device may be implemented in the baseband apparatus 123. The baseband apparatus 123 includes a processor 124 and a memory 125.

For example, the baseband apparatus 123 may include at least one baseband board. Multiple chips are disposed on the baseband board. As shown in FIG. 12, one chip is, for example, the processor 124, and is connected to the memory 125, to invoke a program in the memory 125 to perform an operation of the network side device shown in the foregoing method embodiment.

The baseband apparatus 123 may further include a network interface 126, configured to exchange information with the radio frequency apparatus 122, where the interface is, for example, a Common Public Radio Interface (CPRI).

For example, the network side device in this embodiment of the present disclosure further includes an instruction or a program that is stored in the memory 125 and that can run on the processor 124. The processor 124 invokes the instruction or the program in the memory 125 to perform the method performed by the modules shown in FIG. 11, and a same technical effect is achieved. To avoid repetition, details are not described herein.

An embodiment of this application further provides a readable storage medium. A program or an instruction is stored in the readable storage medium. When the program or the instruction is executed by a processor, the processes of the embodiments of the foregoing resource assignment method can be implemented, and a same technical effect can be achieved. To avoid repetition, details are not described herein.

The processor is a processor in the terminal in the foregoing embodiment. The readable storage medium includes a computer-readable storage medium such as an ROM, an RAM, a magnetic disk, an optical disc, or the like.

An embodiment of this application further provides a chip. The chip includes a processor and a communication interface, the communication interface is coupled to the processor, and the processor is configured to run a program or an instruction of a network side device to implement the processes of the embodiments of the foregoing resource assignment method, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. In some embodiments, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with inference to the accompanying drawings. However, this application is not limited to the foregoing implementations. The foregoing implementations are merely examples, but are not limiting. A person of ordinary skill in the art may make many forms without departing from the objective and the scope of the claims of this application, and these forms all fall within the protection scope of this application.

The invention claimed is:

1. A resource assignment method, performed by a terminal, comprising:
    determining a quantity of Frequency Domain Resource Assignment (FDRA) bits in multicast Downlink Control Information (DCI) based on a first quantity of Resource Blocks (RBs); and
    determining, based on information corresponding to FDRA of the quantity of bits, FDRA of a multicast Physical Downlink Shared Channel (PDSCH) scheduled by the multicast DCI,
    wherein:
        the first quantity of RBs is a quantity of RBs corresponding to a first target Control Resource Set (CORESET), wherein the first target CORESET is a CORESET whose index number is 0,
        the first quantity of RBs is a quantity of RBs comprised in an initial downlink Band Width Part (BWP), or
        the first quantity of RBs is a quantity of RBs comprised in a BWP configured by a network side device for multicast PDSCH transmission.

2. The resource assignment method according to claim 1, wherein the determining, based on information corresponding to FDRA of the quantity of bits, FDRA of a multicast PDSCH scheduled by the multicast DCI comprises:
    determining FDRA of the multicast PDSCH in an initial downlink BWP based on the information corresponding to the FDRA of the quantity of bits and a first RB, wherein
    the first RB is an RB with a smallest number in the initial downlink BWP: or
    determining frequency domain resource assignment of the multicast PDSCH in a BWP configured by the network side device for multicast PDSCH transmission based on the information corresponding to the FDRA of the quantity of bits and a first RB, wherein the first RB is an RB with a smallest number in the BWP configured by the network side device for multicast PDSCH transmission.

3. The resource assignment method according to claim 1, wherein the determining, based on information corresponding to FDRA of the quantity of bits, FDRA of a multicast PDSCH scheduled by the multicast DCI comprises:
determining FDRA of the multicast PDSCH based on the information corresponding to the FDRA of the quantity of bits and a second RB, wherein
the second RB is an RB with a smallest number in RBs corresponding to a second target CORESET,
wherein the second target CORESET is a CORESET whose index number is 0, or the second target CORESET is a CORESET in which the multicast DCI is located.

4. The resource assignment method according to claim 1, wherein the determining, based on information corresponding to FDRA of the quantity of bits, FDRA of a multicast PDSCH scheduled by the multicast DCI comprises:
determining FDRA of the multicast PDSCH in a carrier based on the information corresponding to the FDRA of the quantity of bits and a third RB; wherein
the third RB is an RB with a smallest number in the carrier.

5. The resource assignment method according to claim 1, wherein before the determining, based on information corresponding to FDRA of the quantity of bits, FDRA of a multicast PDSCH scheduled by the multicast DCI, the method further comprises:
obtaining a predefined resource assignment type; or
obtaining a resource assignment type by using higher layer signaling.

6. The resource assignment method according to claim 1, wherein before the determining, based on information corresponding to FDRA of the quantity of bits, FDRA of a multicast PDSCH scheduled by the multicast DCI, the method further comprises:
obtaining a predefined Resource Block Group (RBG) size; or
obtaining an RBG size by using higher layer signaling.

7. A resource assignment method, performed by a network side device, comprising:
determining a quantity of Frequency Domain Resource Assignment (FDRA) bits in multicast Downlink Control Information (DCI) based on a first quantity of Resource Blocks (RBs); and
indicating, based on information corresponding to FDRA of the quantity of bits, FDRA of a multicast Physical Downlink Shared Channel (PDSCH) scheduled by the multicast DCI,
wherein:
the first quantity of RBs is a quantity of RBs corresponding to a first target Control Resource Set (CORESET), wherein the first target CORESET is a CORESET whose index number is 0,
the first quantity of RBs is a quantity of RBs comprised in an initial downlink Band Width Part (BWP), or
the first quantity of RBs is a quantity of RBs comprised in a BWP configured by the network side device for multicast PDSCH transmission.

8. The resource assignment method according to claim 7, wherein the indicating, based on information corresponding to FDRA of the quantity of bits, FDRA of a multicast PDSCH scheduled by the multicast DCI comprises:
indicating FDRA of the multicast PDSCH in an initial downlink BWP based on the information corresponding to the FDRA of the quantity of bits and a first RB, wherein
the first RB is an RB with a smallest number in the initial downlink BWP; or
indicating frequency domain resource assignment of the multicast PDSCH in a BWP configured by the network side device for multicast PDSCH transmission based on the information corresponding to the FDRA of the quantity of bits and a first RB, wherein the first RB is an RB with a smallest number in the BWP configured by the network side device for multicast PDSCH transmission.

9. The resource assignment method according to claim 7, wherein the indicating, based on information corresponding to FDRA of the quantity of bits, FDRA of a multicast PDSCH scheduled by the multicast DCI comprises:
indicating FDRA of the multicast PDSCH based on the information corresponding to the FDRA of the quantity of bits and a second RB; wherein
the second RB is an RB with a smallest number in RBs corresponding to a second target CORESET,
wherein the second target CORESET is a CORESET whose index number is 0, or the second target CORESET is a CORESET in which the multicast DCI is located.

10. The resource assignment method according to claim 7, wherein the indicating, based on information corresponding to FDRA of the quantity of bits, FDRA of a multicast physical downlink shared channel PDSCH scheduled by the multicast DCI comprises:
indicating FDRA of the multicast PDSCH in a carrier based on the information corresponding to the FDRA of the quantity of bits and a third RB; wherein
the third RB is an RB with a smallest number in the carrier.

11. The resource assignment method according to claim 7, wherein the method further comprises:
indicating a resource assignment type through predefining or by using higher layer signaling.

12. The resource assignment method according to claim 7, wherein the method further comprises:
indicating a Resource Block Group (RBG) size through predefining or by using higher layer signaling.

13. A terminal comprising: a memory having a computer program stored thereon; and a processor, wherein the computer program, when executed by the processor, causes the processor to perform a resource assignment method, comprising:
determining a quantity of Frequency Domain Resource Assignment (FDRA) bits in multicast Downlink Control Information (DCI) based on a first quantity of Resource Blocks (RBs); and
determining, based on information corresponding to FDRA of the quantity of bits, FDRA of a multicast Physical Downlink Shared Channel (PDSCH) scheduled by the multicast DCI,
wherein:
the first quantity of RBs is a quantity of RBs corresponding to a first target Control Resource Set (CORESET), wherein the first target CORESET is a CORESET whose index number is 0,
the first quantity of RBs is a quantity of RBs comprised in an initial downlink Band Width Part (BWP), or the first quantity of RBs is a quantity of RBs comprised in a BWP configured by a network side device for multicast PDSCH transmission.

14. The terminal according to claim 13, wherein the determining, based on information corresponding to FDRA of the quantity of bits, FDRA of a multicast PDSCH scheduled by the multicast DCI comprises:
   determining FDRA of the multicast PDSCH in an initial downlink BWP based on information corresponding to FDRA of the quantity of bits and a first RB, wherein the first RB is an RB with a smallest number the initial downlink BWP; or
   determining frequency domain resource assignment of the multicast PDSCH in a BWP configured by the network side device for multicast PDSCH transmission based on the information corresponding to the FDRA of the quantity of bits and a first RB, wherein the first RB is an RB with a smallest number in the BWP configured by the network side device for multicast PDSCH transmission.

15. The terminal according to claim 13, wherein the determining, based on information corresponding to FDRA of the quantity of bits, FDRA of a multicast PDSCH scheduled by the multicast DCI comprises:
   determining FDRA of the multicast PDSCH based on the information corresponding to the FDRA of the quantity of bits and a second RB, wherein
   the second RB is an RB with a smallest number in RBs corresponding to a second target CORESET,
   wherein the second target CORESET is a CORESET whose index number is 0, or the second target CORESET is a CORESET in which the multicast DCI is located.

16. The terminal according to claim 13, wherein the determining, based on information corresponding to FDRA of the quantity of bits, FDRA of a multicast PDSCH scheduled by the multicast DCI comprises:
   determining FDRA of the multicast PDSCH in a carrier based on the information corresponding to the FDRA of the quantity of bits and a third RB; wherein
   the third RB is an RB with a smallest number in the carrier.

17. The terminal according to claim 13, wherein before the determining, based on information corresponding to FDRA of the quantity of bits, FDRA of a multicast PDSCH scheduled by the multicast DCI, the method further comprises:
   obtaining a predefined resource assignment type; or
   obtaining a resource assignment type by using higher layer signaling.

18. The terminal according to claim 13, wherein before the determining, based on information corresponding to FDRA of the quantity of bits, FDRA of a multicast PDSCH scheduled by the multicast DCI, the method further comprises:
   obtaining a predefined Resource Block Group (RBG) size; or
   obtaining an RBG size by using higher layer signaling.

19. A network side device, comprising: a processor, a memory, and a program or an instruction that is stored in the memory and that can run on the processor, wherein when the program or the instruction is executed by the processor, causes the processor to implement the resource assignment method according to claim 9.

* * * * *